US012654727B2

(12) United States Patent
Bakhchina et al.

(10) Patent No.: US 12,654,727 B2
(45) Date of Patent: Jun. 16, 2026

(54) METHOD OF EVALUATING PEOPLE'S PERFORMANCE UNDER HIGH COGNITIVE LOAD

(71) Applicant: Harman International Industries, Incorporated, Stamford, CT (US)

(72) Inventors: Anastasiya Vladimirovna Bakhchina, Nizhny Novgorod (RU); Maksim Varenov, Nizhny Novgorod (RU); Ivan Sergeevich Shishalov, Nizhniy Novgorod (RU); Andrey Viktorovich Filimonov, Nizhegorodskaya oblast (RU); Anastasiya Sergeevna Filatova, Balakhna (RU); Evgeny Pavlovich Burashnikov, Yerevan (AM)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 58 days.

(21) Appl. No.: 18/630,949

(22) Filed: Apr. 9, 2024

(65) Prior Publication Data

US 2025/0313224 A1     Oct. 9, 2025

(51) Int. Cl.
*B60W 50/12*          (2012.01)
*B60W 40/09*          (2012.01)
(Continued)

(52) U.S. Cl.
CPC ............ *B60W 50/12* (2013.01); *B60W 40/09* (2013.01); *B60W 50/0097* (2013.01);
(Continued)

(58) Field of Classification Search
CPC .. B60W 50/12; B60W 40/09; B60W 50/0097; B60W 50/14; B60W 2540/22; B60W 2540/221; G06N 3/08
See application file for complete search history.

(56) References Cited

U.S. PATENT DOCUMENTS 10,877,444 B1    12/2020    Roach et al.
2019/0145860 A1*  5/2019    Phillips ................ G05D 1/0088
                                                    701/33.9
(Continued)

FOREIGN PATENT DOCUMENTS

EP        3989045 A1      4/2022
WO     2021067380 A1      4/2021
(Continued)

OTHER PUBLICATIONS

"European New Car Assessment Programme (Euro NCAP)," Eruo NCAP Website, Available Online at https://www.euroncap.com/media/79883/euro-ncap-assessment-protocol-sa-safe-driving-v103.pdf, Dec. 2023, 37 pages.
(Continued)

*Primary Examiner* — Sohana Tanju Khayer
(74) *Attorney, Agent, or Firm* — McCoy Russell LLP

(57) ABSTRACT

Methods and systems are herein providing for predicting driving performance based on mental state. In one example, a vehicle system comprises a vehicle computing system comprising one or more processors and memory storing instructions that, when executed by the one or more processors, cause the vehicle computing system to adjust one or more vehicle behaviors according to predicted driving performance, wherein the predicted driving performance is determined based on one or more mental states of a driver.

20 Claims, 6 Drawing Sheets

(51) Int. Cl.

| | |
|---|---|
| *B60W 50/00* | (2006.01) |
| *B60W 50/14* | (2020.01) |
| *G06N 3/08* | (2023.01) |

(52) U.S. Cl.

CPC ............... *B60W 50/14* (2013.01); *G06N 3/08* (2013.01); *B60W 2540/22* (2013.01); *B60W 2540/221* (2020.02)

(56) References Cited

U.S. PATENT DOCUMENTS

| | | | | |
|---|---|---|---|---|
| 2020/0107766 | A1* | 4/2020 | Liu | A61B 5/6814 |
| 2020/0247420 | A1* | 8/2020 | Gunaratne | G06V 10/82 |
| 2020/0307551 | A1* | 10/2020 | Horiguchi | B60W 30/02 |
| 2020/0339493 | A1* | 10/2020 | Savo | C07C 37/20 |
| 2021/0256250 | A1* | 8/2021 | Cho | G06T 7/70 |
| 2022/0117529 | A1 | 4/2022 | Filimonov et al. | |
| 2023/0339479 | A1 | 10/2023 | Filimonov et al. | |
| 2024/0034148 | A1* | 2/2024 | St. Gray | B60K 26/021 |
| 2024/0326830 | A1* | 10/2024 | Bakhchina | B60W 50/14 |
| 2024/0408391 | A1* | 12/2024 | Bikson | A61B 5/377 |
| 2024/0419246 | A1* | 12/2024 | Ullrich | G10L 13/08 |
| 2025/0050916 | A1* | 2/2025 | George | B60W 60/0055 |
| 2025/0087333 | A1* | 3/2025 | Meier-Keller | G16H 20/70 |
| 2025/0170708 | A1* | 5/2025 | Vogel | B25J 9/163 |

FOREIGN PATENT DOCUMENTS

| | | | |
|---|---|---|---|
| WO | 2022055383 | A1 | 3/2022 |
| WO | 2022211656 | A1 | 10/2022 |
| WO | 2022250560 | A1 | 12/2022 |
| WO | 2024015018 | A1 | 1/2024 |

OTHER PUBLICATIONS

Bakhchina, V. et al., "Driver Psychophysiological State Detection," U.S. Appl. No. 18/622,688, filed Mar. 29, 2024, 34 pages.
European Patent Office, Partial European Search Report Issued in Application No. 25166294.6, Jul. 24, 2025, Germany, 12 pages.

* cited by examiner

—100

METHOD OF EVALUATING PEOPLE'S PERFORMANCE UNDER HIGH COGNITIVE LOAD

FIELD

The disclosure relates to determining driving performance from mental states.

BACKGROUND

A mental state refers to a state of mind of one or more persons and may comprise mood, cognitive load, visual load, and more. A mental state may vary gradually in intensity, as may be measured via biosignals including eye movement, heart rate, and the like. Mental states may be quantified, for example via a method provided by Filimonov et al in WO2022250560. Mental states such as visual cognitive load and mental cognitive load may have effects on various tasks.

The human brain has its limits in terms of the amount of information it can absorb and process. In cases where the brain is operating close to its capacity and the influx of information and decision making speed exceed these limits, the brain can prioritize processing by allocating more cognitive resources to certain tasks over others. This can result in the postponement or significantly slower resolution of certain types of tasks. In other words, due to increased workload, there may be a substantial decrease in cognitive abilities related to specific tasks or all tasks being addressed during moments of high cognitive load. Examples of such situations include episodes of cognitive blindness, where the individual is unable to pay sufficient attention to certain aspects of their environment due to being heavily "distracted" by other factors.

As one example, driving performance may suffer during periods of high cognitive load. For example, ability to stay within a designated lane and to follow a designated route may decrease during periods of high cognitive load. Thus, there is a demand for evaluating driving performance during various amounts of cognitive load from which interventions for vehicles may be derived.

SUMMARY

In one or more embodiments, a vehicle system comprises a vehicle computing system comprising one or more processors and memory storing instructions that, when executed by the one or more processors, cause the vehicle computing system to adjust one or more vehicle behaviors according to predicted driving performance, wherein the predicted driving performance is determined based on one or more mental states of a driver.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The disclosure may be better understood from reading the following description of non-limiting embodiments, with reference to the attached drawings, wherein below.

DETAILED DESCRIPTION

Figure 1:
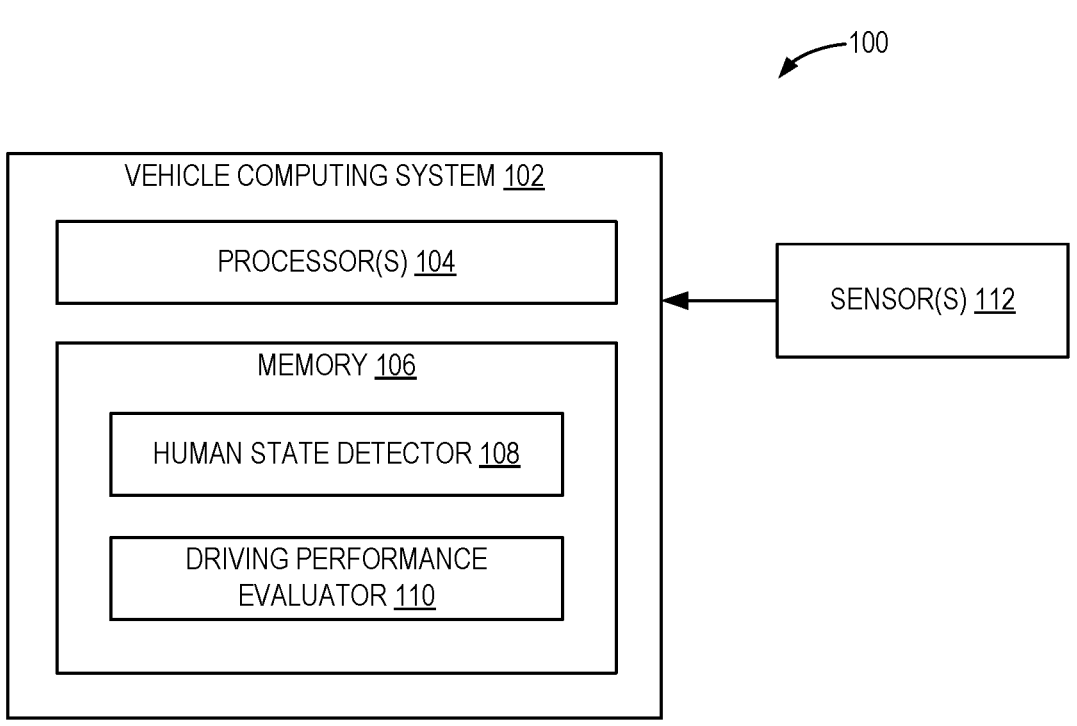
FIG. 1 shows an exemplary vehicle system, in accordance with one or more embodiments of the present disclosure.
Figure 2:
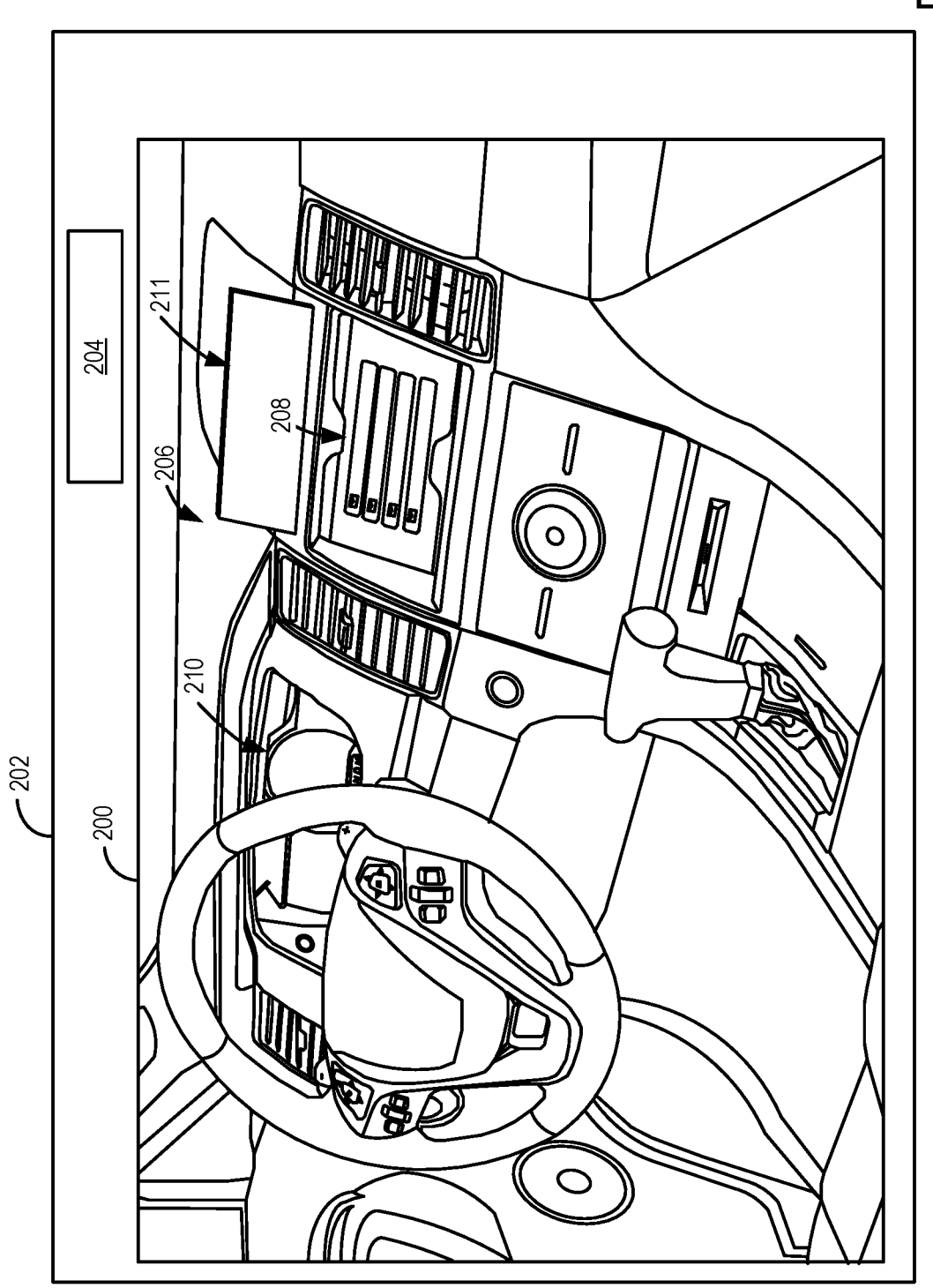
FIG. 2 shows an example partial view of a vehicle cabin including an instrument panel, in accordance with one or more embodiments of the present disclosure.
Figure 3:
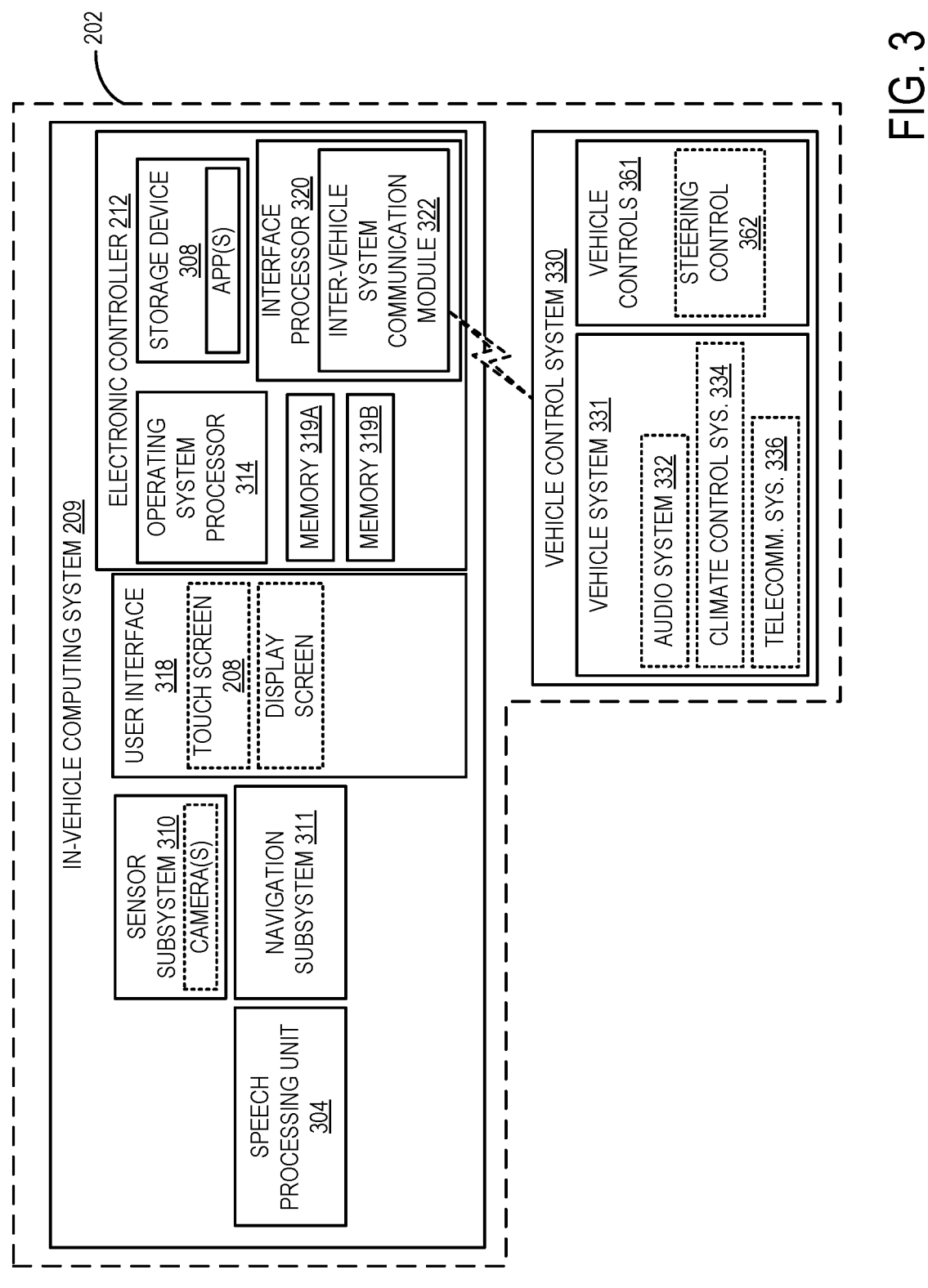
FIG. 3 shows a block diagram of an example in-vehicle computing system of a vehicle, in accordance with one or more embodiments of the present disclosure.
Figures 4A, 4B:
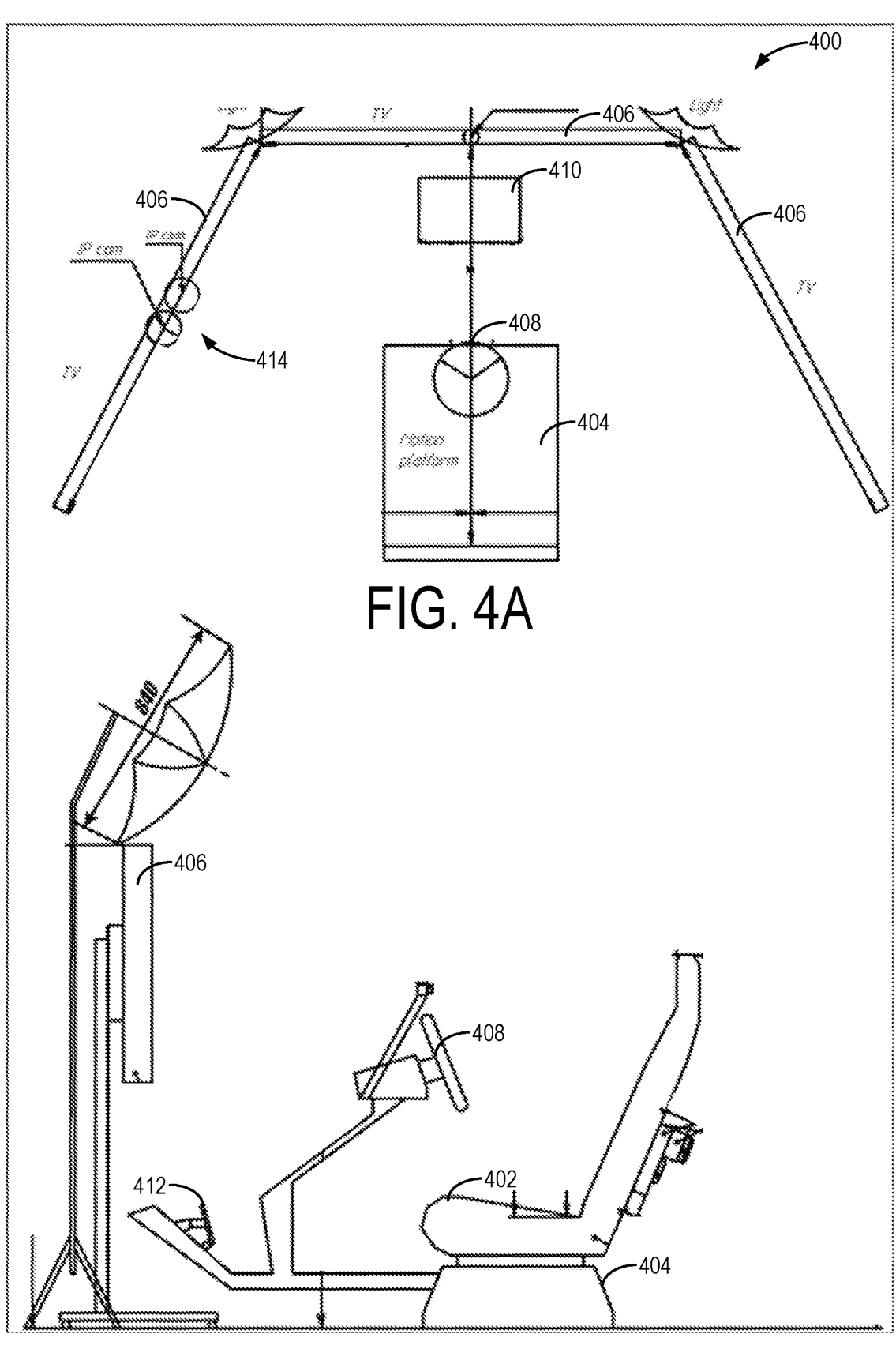
FIG. 4A shows a top view of an example vehicle simulation system, in accordance with one or more embodiments of the present disclosure.
FIG. 4B shows a side view of the example vehicle simulation system, in accordance with one or more embodiments of the present disclosure.
Figure 5:
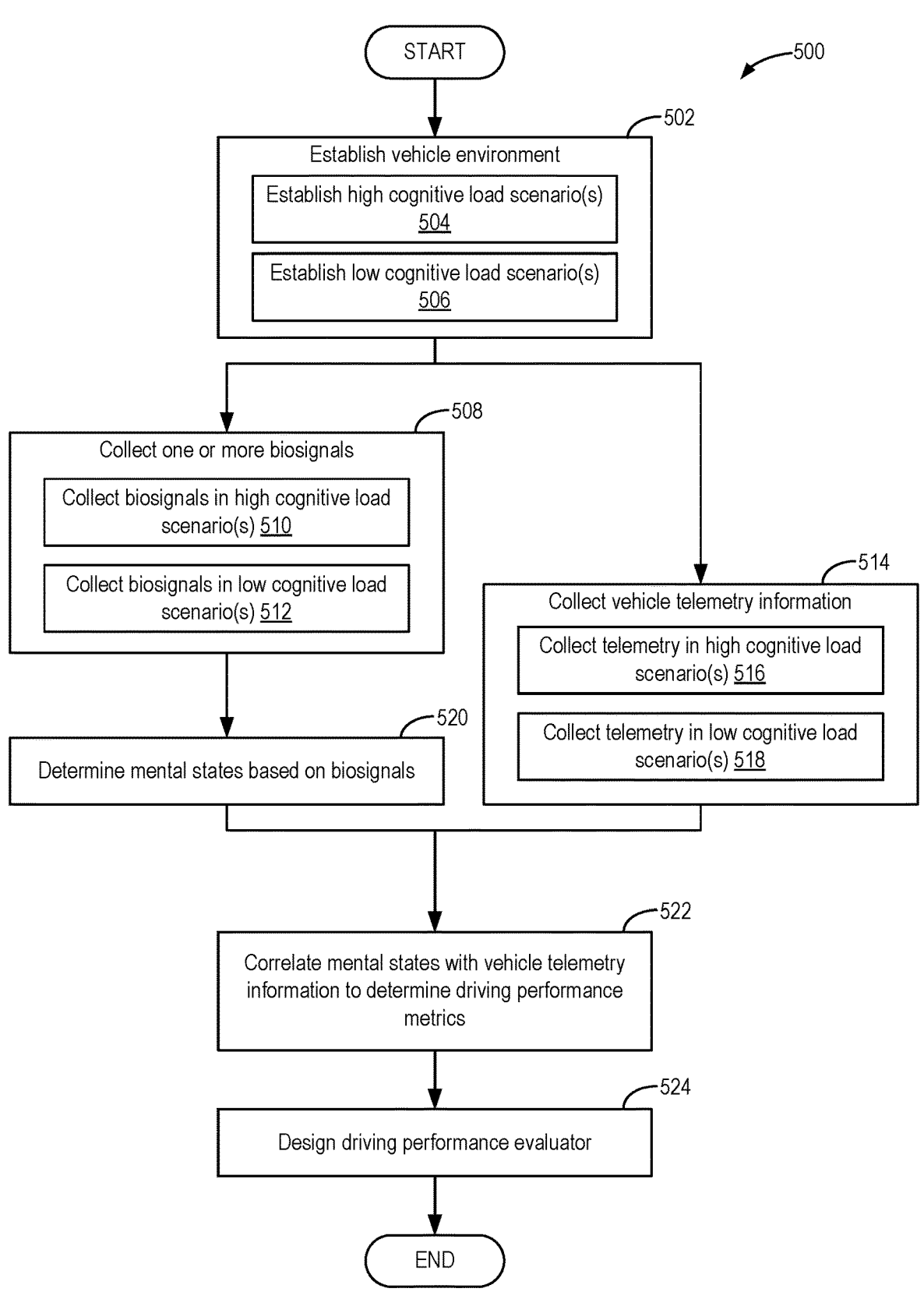
FIG. 5 shows a flowchart for evaluating driver performance, in accordance with one or more embodiments of the present disclosure.
Figure 6:
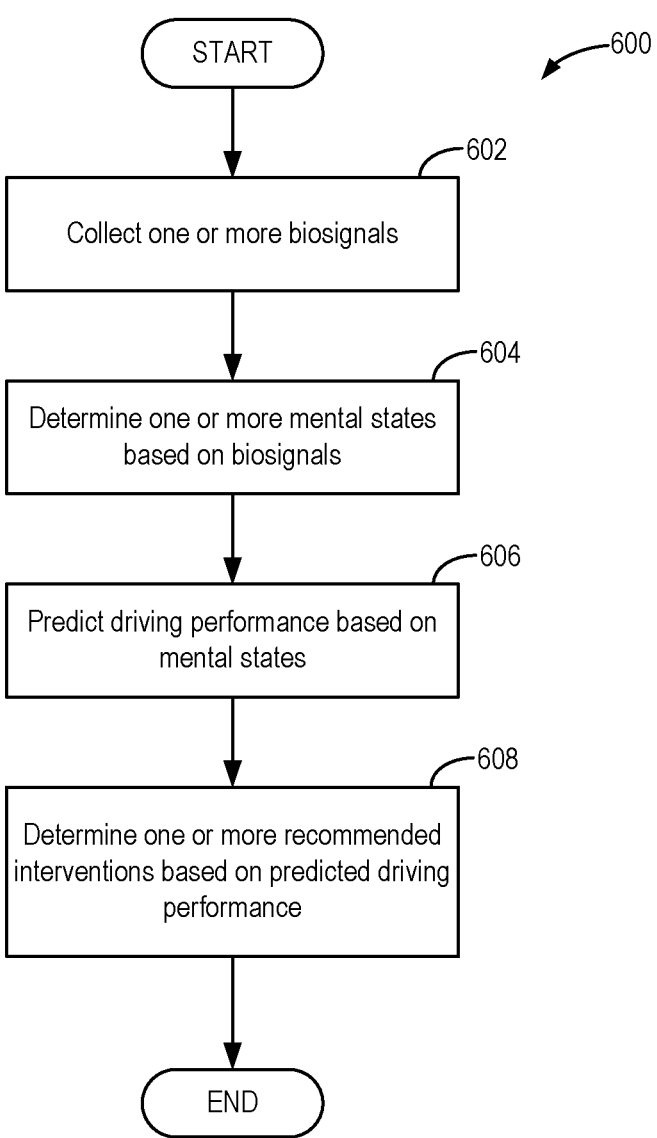
FIG. 6 shows a flowchart illustrating a method for determining interventions based on mental states, in accordance with one or more embodiments of the present disclosure.

The following description relates to systems and methods for evaluating driver performance based on mental state. In one example, a driving performance evaluator may be generated based on data acquired with a vehicle simulation system. The driving performance evaluator may be incorporated into a vehicle computing system of a vehicle and may ingest data of biosignals and mental states in order to predict driving performance of a driver. FIG. 1 shows an example vehicle system. FIG. 2 shows an example partial view of a vehicle cabin. FIG. 3 shows a block diagram of an example in-vehicle computing system of a vehicle system, such as the vehicle system of FIG. 1. FIGS. 4A and 4B show diagrams of an example vehicle simulation system. FIG. 5 illustrates a method for generating a driving performance evaluator and FIG. 6 illustrates a method for determining interventions based on mental states using the driving performance evaluator.

Driving a vehicle is a relatively high cognitive load activity, in terms of visual input, decision making, and the like. Factors unrelated to driving, including interacting with an infotainment unit, talking on the phone, and the like, increase the cognitive load of the driver and may have effects of driving performance. However, collecting data of driving performance evaluation in real world scenarios is difficult due to inherent risks of intentionally causing increased cognitive and/or mental load, which may result in poor driving performance, including lane departures, excess speed, and/or collisions. Thus, systems and methods are herein provided for generation of a driving performance evaluator based on data collected in a simulated vehicle environment. The simulated vehicle environment may provide a controlled scenario in which amounts of cognitive load may be varied and determinations may then be made regarding driving performance for various mental states (e.g., states corresponding to amounts of cognitive load). The driving performance evaluator that is generated based on this data may be a trained neural network that, when incorporated into a vehicle, may ingest data such as biosignals and/or mental states determined thereby and output predicted driving performance. The predicted driving performances may inform a computing system of the vehicle to make one or more system interventions, such as adjustments to driver assistance programming (e.g., advanced driver assistance systems (ADAS)). In this way, the simulator as herein provided allows for collection of a specific type of data that would otherwise be difficult or time consuming to collect and the data collected thereby may be used to generate (e.g., train) a system implemented in a vehicle.

FIG. 1 shows a vehicle system 100, including a vehicle computing system 102. The vehicle system 100 as herein presented may be a vehicle configured for driving on roads, such as a battery electric vehicle (BEV), a hybrid electric vehicle (HEV), a vehicle with an internal combustion engine, or any other type of suitable vehicle. Vehicle computing system 102 includes one or more processors 104 configured to execute machine readable instructions stored in non-transitory memory 106. Memory 106 and other memory referred to herein may include one or more data storage structures, such as optical memory devices, magnetic memory devices, or solid-state memory devices, for storing programs and routines executed by processor(s) 104 to carry out various functionalities disclosed herein. Memory 106 may include any desired type of volatile and/or non-volatile memory such as, for example, static random access memory (SRAM), dynamic random access memory (DRAM), flash memory, read-only memory (ROM), etc.

Processor(s) 104 and other processors referred to herein may be any suitable processor, processing unit, or microprocessor, for example. Processor(s) 104 may be a multiprocessor system, and, thus, may include one or more additional processors that are identical or similar to each other and that are communicatively coupled via an interconnection bus. Processor(s) 104 may be single core or multi-core, and the programs executed thereon may be configured for parallel or distributed processing. In some embodiments, processor(s) 104 may optionally include individual components that are distributed throughout two or more devices, which may be remotely located and/or configured for coordinated processing. In some embodiments, one or more aspects of processor(s) 104 may be virtualized and executed by remotely-accessible networked computing devices configured in a cloud computing configuration.

The vehicle system 100 may also comprise one or more sensors 112. The one or more sensors 112 may be configured for acquiring information about a user of the vehicle system 100 (e.g., a driver) and about the vehicle. For example, the one or more sensors 112 may comprise infrared (IR) cameras configured for tracking eyegaze and eyelid information. The one or more sensors 112 may also comprise vehicle environment telemetry sensors that indicate metrics such as position within lane, steering wheel position, pedal position, speed, acceleration, yaw rate, and the like.

Memory 106 may store instructions for detecting human states, such as mental cognitive load and visual cognitive load, in a human state detector 108. The human state detector 108 may ingest one or more biosignals acquired by one or more sensors 112, such IR sensors configured for sensing eyegaze, and may execute software configured to track eyegaze via data from the sensors.

Memory 106 may also store instructions for determining and/or evaluating driving performance, via a driving performance evaluator 110. The driving performance evaluator 110 may be configured to ingest data from the one or more sensors 112 related to biosignals and mental (e.g., human) state and data related to vehicle environment telemetry and reaction time (e.g., a driving reaction time (DRT) device). The driving performance evaluator 110 may use the human states determined by the human state detector 108, vehicle telemetry data, and reaction time data, to predict driving performance, as will be explained further herein. Thus, the vehicle computing system 102 may be configured to adjust one or more vehicle behaviors, such as adjusting ADAS parameters and/or presenting notifications to the driver, according to predicted driving performance.

FIG. 2 shows an example partial view of an interior of a cabin 200 of a vehicle 202, in which a driver and/or one or more passengers may be seated. Vehicle 202 may be the vehicle system 100 shown by FIG. 1 and described above, in some examples. In other examples in which the vehicle system is a simulator system environment, the cabin 200 may be a simulated environment that includes a chair, multiple screens, and the like.

Vehicle 202 of FIG. 2 may be a motor vehicle including drive wheels (not shown) and a power source 204 configured to provide torque to the drive wheels, such as an internal combustion engine and/or battery. In examples in which the power source 204 includes an internal combustion engine, the internal combustion engine may include one or more combustion chambers which may receive intake air via an intake passage and exhaust combustion gases via an exhaust passage. Vehicle 202 may be a road automobile, among other types of vehicles. In some examples, vehicle 202 may include a hybrid propulsion system including an energy conversion device operable to absorb energy from vehicle motion and/or the engine and convert the absorbed energy to an energy form suitable for storage by an energy storage device. Vehicle 202 may be a fully electric vehicle in some examples, incorporating fuel cells, solar energy capturing elements, and/or other energy storage systems for powering the vehicle.

As shown, the vehicle 202 may include an instrument panel 206 with various displays and controls accessible to a human driver (also referred to as the user and/or occupant) of vehicle 202. For example, instrument panel 206 may include a touch screen 208 of an in-vehicle computing system (e.g., vehicle computing system 102 of FIG. 1) and an instrument cluster 210. Touch screen 208 may receive user input to the in-vehicle computing system for controlling visual display output, user preferences, control parameter selection, and so on. While the example system shown in FIG. 2 includes controls that may be performed via a user interface of the in-vehicle computing system, such as touch screen 208, without a separate control panel, in other embodiments, the vehicle may include additional control panels. In some embodiments, one or more hardware elements of in-vehicle computing system 209, such as touch screen 208, a display screen 211 (e.g. display screen 116), various control dials, knobs and buttons, memory, processor(s), and any interface elements (e.g., connectors or ports) may form an integrated head unit that is installed in instrument panel 206 of the vehicle. The head unit may be fixedly or removably attached in instrument panel 206. In additional or alternative embodiments, one or more hardware elements of in-vehicle computing system 209 may be modular and may be installed in multiple locations of the vehicle.

During operation of vehicle 202, the in-vehicle computing system may be configured to receive electronic signals from the various sensors of the vehicle 202, such as sensors 112 of FIG. 1, in some examples. The signals from the various sensors, may be decoded, translated, or otherwise processed by the in-vehicle computing system in order to determine one or more human states, such as mental states indicative of mental cognitive load and/or visual cognitive load.

FIG. 3 shows a block diagram of an in-vehicle computing system 209 integrated inside vehicle 202, where in-vehicle computing system 209 may be a non-limiting example of vehicle computing system 102 of vehicle 101 of FIG. 1. In-vehicle computing system 209 may be referred to herein as a controller and/or electronic controller in some examples. In-vehicle computing system 209 may perform one or more of the methods described herein in some embodiments. In-vehicle computing system 209 may include, or be coupled to, various vehicle systems, sub-systems, hardware components, as well as software applications and systems that are integrated in, or integratable into, vehicle 202.

In-vehicle computing system 209 may include one or more processors including an operating system processor 314 and an interface processor 320. Operating system processor 314 may execute an operating system on in-vehicle computing system 209, and control input/output, display, and other operations of in-vehicle computing system 209. Interface processor 320 may with a vehicle control system 330 via an inter-vehicle system communication module 322.

Inter-vehicle system communication module 322 may output data to one or more other vehicle systems 331 and/or one or more other vehicle control elements 361, while also receiving data input from other vehicle systems 331 and other vehicle control elements 361, e.g., by way of vehicle control system 330. When outputting data, inter-vehicle system communication module 322 may provide a signal via a bus corresponding to any status of the vehicle, the vehicle surroundings, or the output of any other information source connected to the vehicle. Vehicle data outputs may include, for example, analog signals (such as current velocity), digital signals provided by individual information sources (such as clocks, thermometers, location sensors such as GPS sensors, and so on), digital signals propagated through vehicle data networks (such as an engine controller area network (CAN) bus through which engine related information may be communicated, a climate control CAN bus through which climate control related information may be communicated, and a multimedia data network through which multimedia data is communicated between multimedia components in the vehicle), and so on. For example, in-vehicle computing system 209 may retrieve from the engine CAN bus the current speed of the vehicle estimated by the wheel sensors, a power state of the vehicle via a battery and/or power distribution system of the vehicle, an ignition state of the vehicle, a condition of one or more air bags of the vehicle, a condition of hazard lights of the vehicle, a condition of the power source 204 (shown by FIG. 2) of the vehicle, and so on. In addition, other interfacing means such as Ethernet may be used as well without departing from the scope of this disclosure.

A storage device 308 may be included in in-vehicle computing system 209 to store data such as instructions executable by operating system processor 314 and/or interface processor 320 in non-volatile form. Storage device 308 may store application data to enable in-vehicle computing system 209 to run an application for connecting to a cloud-based server and/or collecting information for transmission to the cloud-based server. The application may retrieve information gathered by vehicle systems/sensors, input devices (e.g., a user interface 318), data stored in one or more storage devices, such as a volatile memory 319A or a non-volatile memory 319B, devices in communication with the in-vehicle computing system, and so on. In-vehicle computing system 209 may further include a volatile memory 319A. Volatile memory 319A may be random access memory (RAM). Non-transitory storage devices, such as non-volatile storage device 308 and/or non-volatile memory 319B (e.g., non-transitory memory), may store instructions and/or code that, when executed by a processor (e.g., operating system processor 314 and/or interface processor 320), controls in-vehicle computing system 209 to perform one or more of the actions described in the disclosure.

One or more additional sensors may be included in a sensor subsystem 310 of in-vehicle computing system 209. For example, sensor subsystem 310 may include a camera, such as a rear view camera for assisting a user in parking the vehicle and/or a cabin camera for identifying a user (e.g., using facial recognition and/or user gestures). Sensor subsystem 310 of in-vehicle computing system 209 may communicate with and receive inputs from various vehicle sensors and may further receive user inputs. For example, the inputs received by sensor subsystem 310 may include transmission gear position, transmission clutch position, gas pedal input, brake input, transmission selector position, vehicle speed, engine speed, mass airflow through the engine, ambient temperature, intake air temperature, and so on, as well as inputs from climate control system sensors (such as heat transfer fluid temperature, antifreeze temperature, fan speed, passenger compartment temperature, desired passenger compartment temperature, ambient humidity, and so on), an audio sensor detecting voice commands issued by a user, a fob sensor receiving commands from and optionally tracking the geographic location/proximity of a fob of the vehicle, and so on.

While certain vehicle system sensors may communicate with sensor subsystem 310 alone, other sensors may communicate with both sensor subsystem 310 and vehicle control system 330, or may communicate with sensor subsystem 310 indirectly via vehicle control system 330. A navigation subsystem 311 of in-vehicle computing system 209 may generate, transmit, receive, and/or process navigation information such as location information (e.g., via a GPS sensor and/or other sensors from sensor subsystem 310), route guidance, traffic information, point-of-interest (POI) identification, and/or provide other navigational services for the driver.

Vehicle control system 330 may include controls for controlling aspects of various vehicle systems 331 involved in different in-vehicle functions. These may include, for example, controlling aspects of vehicle audio system 332, aspects of a climate control system 334, aspects of a telecommunication system 336, and so on.

Vehicle control system 330 may also include controls for adjusting the settings of various vehicle control elements 361 (or vehicle controls, or vehicle system control elements) related to the engine and/or auxiliary elements within the cabin of the vehicle, such as one or more steering wheel controls 362 (e.g., steering wheel-mounted audio system controls, cruise controls, windshield wiper controls, headlight controls, turn signal controls, and so on), instrument panel controls, microphone(s), accelerator/brake/clutch pedals, a gear shift, door/window controls positioned in a driver or passenger door, seat controls, cabin light controls, audio system controls, cabin temperature controls, and so on. Vehicle control elements 361 may also include internal engine and vehicle operation controls (e.g., engine controller module, actuators, valves, and so on) that are configured to receive instructions via the CAN bus of the vehicle to change operation of one or more of the engine, exhaust system, transmission, and/or other vehicle system.

One or more elements of in-vehicle computing system 209 may be controlled by a user via user interface 318. User interface 318 may include a graphical user interface presented on a touch screen, such as touch screen 208 and/or display screen 211 of FIG. 2, and/or user-actuated buttons, switches, knobs, dials, sliders, and so on. For example, user-actuated elements may include steering wheel controls, door and/or window controls, instrument panel controls, audio system settings, climate control system settings, and the like. A user may also interact with one or more applications of in-vehicle computing system 209 via user interface 318. In addition to receiving a user's vehicle setting preferences on user interface 318, vehicle settings selected by in-vehicle control system 330 may be displayed to a user on user interface 318. Notifications and other messages (e.g., received messages), as well as navigational assistance, may be displayed to the user on a display of the user interface. User preferences/information and/or responses to presented messages may be performed via user input to the user interface.

Although the electronic controller 212 is shown including the operating system processor 314, memory 319A, memory 319B, and so on, in some embodiments the electronic controller 212 may include a different number and/or configuration of components. For example, the electronic controller 212 may additionally be integrated with the one or more antennas 306, the one or more transmitters 338, and so on.

Turning to FIGS. 4A and 4B, an example of a vehicle simulation system 400 is shown. The vehicle simulation system 400 may be configured with a vehicle computing system, including one or more processors and memory storing instructions executable by the one or more processors. The vehicle computing system may be configured to obtain biosignals, determine mental state based on biosignals, and determine vehicle telemetry information. Further, the vehicle simulation system 400 may be configured to provide a variable cognitive load vehicle environment scenario that includes a session wherein a user operates a vehicle simulation system to drive along a preprogrammed route while executing a variable cognitive load testing. FIG. 4A shows a top view of the vehicle simulation system 400 and FIG. 4B shows a side view of the vehicle simulation system 400. Thus, the vehicle simulation system 400 may comprise a vehicle computing system with one or more processors and memory storing instructions executable by the processors.

Vehicle simulation system 400 may comprise a seat 402 configured for a user (e.g., a driver) to sit in. The seat 402 may be mounted atop a motion platform 404 configured to provide a driving experience to the user.

The vehicle simulation system 400 may further comprise one or more televisions 406 configured to provide a wide field view that emulates a view through a windshield of a vehicle. The one or more televisions 406 may display simulations of a driving environment, such as roads, other vehicles, surroundings, and the like, based on instructions stored in memory.

The vehicle simulation system 400 may further comprise a tablet 410 configured to display data such as NBACK tests and receive inputs from the user. The tablet 410 may thus be configured to display interactive data for affecting the cognitive load on the user. The data displayed by the tablet 410 may be configured and executed based on instructions stored in memory. For example, instructions for an NBACK test may be stored in memory and the NBACK test may then be displayed or otherwise presented via the tablet 410. The user may then provide input to the tablet 410 in order to complete the NBACK test.

The vehicle simulation system 400 may comprise a steering wheel 408 and pedals 412 through which the user may simulate driving. For example, the user may turn the steering wheel 408 and active the pedals 412 in order to simulate driving. The vehicle computing system may receive the data from the steering wheel 408 and the pedals 412 to determine driving metrics, such as speed, acceleration, position with lane, compliance with prescribed route, and the like.

The vehicle simulation system 400 may comprise one or more sensors 414. The one or more sensors 414 may be IR eyetracking sensors configured to provide eyegaze and eyelid information of the user to the vehicle computing system. The one or more sensors 414 may be mounted with the one or more televisions 406 in order to track the movements and other actions of the user's eyes as they look at the one or more TVs 406 and the tablet 410.

Turning now to FIG. 5, a flowchart illustrating a method 500 for generating a driving performance evaluator is shown. The method 500 may be executed by one or more processors of a vehicle computing system. The vehicle computing system may include instructions stored in memory executable by the one or more processors to perform the method 500. The vehicle computing system may be part of a vehicle system. In some instances, the vehicle system may be a simulated vehicle environment, such as the vehicle simulation system described with respect to FIGS. 4A and 4B.

At 502, method 500 includes establishing a vehicle environment. The vehicle environment may be a variable cognitive load vehicle environment scenario that includes a session wherein a user operates a vehicle simulation system to drive along a preprogrammed route while executing a variable cognitive load testing. The vehicle environment may include a preprogrammed testing (e.g., NBACK test) that is presented to the user via a tablet as well as a route of which the user is to follow via the steering wheel and pedals. As a non-limiting example, the environment may include a resting stage and a driving stage. The resting stage may include watching a video and sitting with eyes closed. The driving stage may include a highway driving portion of a route and a city driving portion of the route. The highway driving portion may have a preprogrammed speed limit (e.g., 45 mph) and may have an endless route along a highway lane. The city driving portion may have variable speed limits, traffic lights, stop signs, turns, and the like. The vehicle environment may be calibrated to the user, wherein calibration includes calibrating to the user's breathing and calibrating to the user's eye movements (e.g., via following a dot on a screen).

The vehicle environment may also include the preprogrammed testing configured to provide various amounts of cognitive load to the user. As an example, an NBACK test may be programmed and provided to the user via the tablet. The NBACK test may comprise, in a non-limiting example, a working memory test in which letters are shown or audibly presented and the user may indicate via the tablet when repeated letters are given. The user may drive along the presented route (e.g., in city or highway portions) without interruption during the testing. The NBACK test and route may thus establish high cognitive load scenario(s), as at 504, and low cognitive load scenario(s), as at 506.

At 508, method 500 includes collecting one or more biosignals. Collection of the one or more biosignals may be performed both in the high cognitive load scenario(s), as at 510, and in the low cognitive load scenario(s), as at 512. The one or more biosignals may comprise eye movements, such as saccades and fixations, and eyelid metrics such as blinks, time spent closed, closure speed, and the like. Other biosignals, such as heart rate, temperature, and the like may also be obtained as indicators of user stress level.

At 512, method 500 includes collecting vehicle telemetry information. Collection of the vehicle telemetry information may be performed both in the high cognitive load scenario(s), as at 516, and in the low cognitive load scenario(s), as at 518. The vehicle telemetry information may include data such as position within the lane, steering wheel position, pedal position, speed, acceleration, etc. The vehicle telemetry information may provide driving metrics, including how often the user leaves the lane, how often the driver drives outside of a threshold range of the speed limit, and the like. Vehicle telemetry may also include driver reaction time information. For example, a time between a traffic light turning green and the user releasing a brake and pressing on an accelerator pedal may indicate driver reaction time. In practice, the one or more biosignals and the vehicle telemetry information may be collected substantially simultaneously as the driver operates the vehicle simulator so as to allow for correlation between the determined mental states and the vehicle telemetry data.

Vehicle environment and collection of biosignals and vehicle telemetry may be performed for various different sessions, in some examples, so as to provide vast amounts of data.

At 520, method 500 includes determining mental states based on the biosignals. Mental states may include high mental cognitive load, high visual cognitive load, low mental cognitive load, low visual cognitive load, and the like. When in a high mental or visual cognitive load state, the driver may be distracted or unfocused on driving, as may be the case during completion of an NBACK test. Low cognitive load as herein described relates to how much input is applied by the testing, whereby low cognitive load indicates a lack of stimulus (e.g., no testing).

In some examples, determination of mental states may be executed by deployment of a trained neural network. The trained neural network may be trained on inputs of biosignals and outputs of mental states. Thus, the trained neural network may ingest the biosignals acquired by the vehicle simulation system and may output a mental state basted thereon.

At 522, method 500 includes correlating mental states with vehicle telemetry information to determine driving performance metrics. The correlation may include correlating driving behaviors, such as lane departures, with various amounts of cognitive load. For example, an increased amount of unintentional lane departures may be correlated with high cognitive load, based on the determined mental states based on the biosignals and the vehicle telemetry data. Driving performance metrics may comprise metrics such as partial or full departure to the right road shoulder, partial or full departure to the oncoming lane, full departure to the right road shoulder, accident leading to car damage, route violation (e.g., missing a turn or turning wrong direction), accident or route violation, latitudinal movement within lane, full or partial departure from lane (e.g., involuntary), use of brake, overspeeding, average reaction time over a positive stimulus, miss of positive stimulus (e.g., no reaction within threshold time), false reaction to negative stimulus, and the like.

As a non-limiting example, the correlations may indicate how reaction time (RT) depends on mental load (ML). To implement the vehicle computing system, a function of $RT=F(ML)$ may be created. The function would take mental load and produce anticipated reaction time drivers will have under such cognitive load. There can be several ways of how the correlation is done and the function is constructed. For example, one way is when average RT is evaluated for the whole test population under acceptable ML (center of the acceptable range is 0.45 for a particular detector and chosen range of acceptable mental load levels, let's name it RTacc) and high ML (center of the high range is 0.8, let's name it RThigh) and then a linear interpolation/extrapolation is built around average RT values. Such function would have $RTacc=F(0.45)$ and $RThigh=F(0.8)$, linearly interpolate between 0.45 and 0.8 and linearly extrapolate outside of 0.45-0.8 range. Another example method is seeing the whole set of possible reaction times people may have under acceptable and high ML and then characterizing ranges, so that two RT ranges would correspond to acceptable ML and high ML. The ranges may overlap.

At, 524, method 500 includes designing a driving performance evaluator. In some examples, the data from evaluation of driving performance may be used to construct the driving performance evaluator, such as the driving performance evaluator 110 of FIG. 1. As an example, the data from evaluation of driving performance may be used to train a neural network configured to ingest one or more biosignals and predict driving performance therefrom. As an example, biosignals, mental states, and correlated driving performance metrics may be inputted into a training module. The training module may ingest biosignals and/or mental states as inputs and the driving performance metrics as targets. The training module may then use the ingested data to train a neural network in order to ingest biosignals and/or mental states and output performance metrics, which may then be associated with vehicle system adjustment recommendations. As another example, biosignals, mental states, and correlated driving performance metrics may be used to generate linear approximations of the correlation within the driving performance evaluator. The linear correlations then may ingest obtained biosignals and/or determined mental states to predict driving behavior. As will be described below with respect to FIG. 6, one or more second biosignals and/or one or more second mental states may be fed into the driving performance evaluator from a vehicle in order to output predicted driving performance.

The generation of the driving performance evaluator, as herein presented, may include multiple sessions in which the user drives the driving simulator while intermittently performing other tasks in order to vary the amount of cognitive load of the user. Collecting data and correlations with the vehicle simulator system may provide for a controlled environment, less downtime for collection, and a condensed setting, thereby allowing for increased amounts of data acquisition at various cognitive loads. The vehicle stimulator may have multiple attributes that are known to the system and/or measured at regular intervals, such as every 1 second. The intervals may be more frequent than an actual vehicle, allowing for greater and more precise amounts of data that is acquired during a session. During a session, the vehicle simulator may be calibrated to the user (e.g., calibrated to breathing and eye movement of the user), and the user may then rest for a period of time to reduce an amount of cognitive load to a baseline. The session may then commence with highway driving portions and city driving portions. While driving, the user may complete the NBACK test at various times to challenge the user's attention and memory. Challenging the user's attention and memory may increase cognitive load, therefore periods in which the user is performing the NBACK test and driving at the same time may be associated with high cognitive load. Periods when the user is only driving may be associated with average cognitive load. Periods of rest, as before driving commences, may be associated with low cognitive load.

The driving sessions, for example the city portions, may provide for specific combinations of stimuli, such as traffic lights, turns, lane changes, and the like that emulate a real driving experience without exposing the user to intentionally high cognitive load during actual driving. Further, driving performance metrics may reflect aspects of driving style. The methodology for assessing them includes analyzing three types of roads: city driving, highway driving, and highway driving with simultaneous reaction time check. The road types determine the driving performance metrics that are subject to evaluation. For example, assessing the likelihood of missing turns is irrelevant on highways due to their structure, which lacks turns. Similarly, evaluating lane positioning characteristics in city driving is also less meaningful as those characteristics are predominantly influenced by specific urban route features rather than cognitive factors. Some metrics, such as those related to reaction time, demand additional interaction with the users, which is challenging to accomplish in urban driving conditions. Thus, the metrics as described above may be catered to the specific portion of the driving session, further affecting how the driving performance evaluator is generated (e.g., how the neural network is trained).

The vehicle simulation system thus provides a controlled environment in which amounts of cognitive load are specifically provided and known. Therefore, analysis and correlation of mental states and driving performance may be made with greater accuracy, providing for generation of a more accurate driving performance evaluator. The controlled environment of the vehicle simulation system may thus allow for generation of high volumes of a particular type of data that is otherwise technically difficult to obtain using real driving vehicles and real driving scenarios. As an example, collecting data of lane divergences, speed over a designated speed limit, or vehicle collisions in a real-world environment may not be feasible due to potential hazards to the driver and other people on the road. Thus, the simulation system allows for collection of such data at a sufficiently high data volume but with correspondingly low noise due to the simulation environment, such data otherwise being difficult to obtain due to the controlled environment of the simulation system. In this way, this unique data set is particularly beneficial for training, using the training method as described herein.

The vehicle simulation system and the driving performance evaluator that is trained on the data obtained with the vehicle simulation system may be a driver-in-the-loop system, whereby outputs provided by the driving performance evaluator may be confirmed or corrected by the driver, which in turn affects the training and outputs of the evaluator.

Turning now to FIG. 6, a flowchart illustrating a method 600 for determining interventions based on mental states is shown. The method 600 may be executed by one or more processors of a vehicle computing system. The vehicle computing system may include instructions stored in memory executable by the one or more processors to perform the method 600. The vehicle computing system may be part of a vehicle system configured for driving on a road, such as vehicle system 100 of FIG. 1.

At 602, method 600 includes collecting one or more biosignals. The one or more biosignals, as described previously, may include eye movements, obtain via an eyetracker sensor, eyelid movements, heart rate, temperature, and the like.

At 604, method 600 includes determining one or more mental states (e.g., human sates) based on the biosignals.

The one or more mental states may include various amounts of visual cognitive load, various amounts of mental cognitive load, and the like.

At 606, method 600 may include predicting driving performance based on the one or more mental states. The one or more mental states may be fed into a driving performance evaluator in order to predict driving performance based on the one or more mental states. For example, the driving performance evaluator may be a trained neural network that may ingest the one or more mental states and output a predicted driving performance. The trained neural network, as described above, may be trained based on correlated driving performance metrics to mental states. While a neural network is herein described, it should be understood that the driving performance evaluator may have other architectures configured to predict driving performance based on mental states, such as linear approximations of correlations, as described above. The method 500 provided in FIG. 5 may show a method for collecting data and correlations that may build the driving performance evaluator.

At 608, method 600 includes determining one or more recommended interventions based on predicted driving performance. Such interventions may include alerting the user (e.g., the driver), adjusting ADAS parameters, and the like that may adjust vehicle operations given the predicted driving performance. The ADAS interventions may include turning on or adjusting parameters of adaptive cruise control, turning on or adjusting parameters of lane centering (e.g., reducing breadth of divergence allowed), adjusting vehicle speed, pulling the vehicle over to the side of the road, and the like, as non-limiting examples.

Implementation of the driving performance evaluator as is described herein may thus allow for interventions to vehicle systems based on determined driving performance. As an example, a mental state of a driver may be determined to be a high cognitive load state (e.g., a distracted state) and the driving performance evaluator may predict driving performance according to one or more metrics as outputted by the driving performance evaluator, which may allow for the vehicle system interventions. Thus, the vehicle system as herein presented may use mental states and/or biosignals to make vehicle system adjustments, such as ADAS adjustments.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices. The methods may be performed by executing stored instructions with one or more logic devices (e.g., processors) in combination with one or more additional hardware elements, such as storage devices, memory, hardware network interfaces/antennas, switches, actuators, clock circuits, and so on. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," and so on. are used merely as labels, and are not intended to impose numerical requirements or a particular positional order on their objects. The following claims particularly point out subject matter from the above disclosure that is regarded as novel and non-obvious.

The invention claimed is:

1. A vehicle system, comprising:
a vehicle computing system comprising:
    a driving performance evaluator, wherein the driving performance evaluator is built based on data obtained during one or more controlled environment scenarios, and wherein at least one of the one or more controlled environment scenario comprises a plurality of periods including a calibration period, a rest period, and a driving period, the driving period comprising city driving portions and highway driving portions; and
one or more processors and memory storing instructions that, when executed by the one or more processors, cause the vehicle computing system to:
    determine a predicted driving performance via the driving performance evaluator; and
    adjust one or more vehicle behaviors according to the predicted driving performance, wherein the predicted driving performance is determined based on one or more mental states of a driver.

2. The vehicle system of claim 1, wherein the one or more mental states of the driver are determined based on one or more biosignals acquired by one or more sensors of the vehicle system.

3. The vehicle system of claim 2, wherein the one or biosignals comprise one or more of eye movements, eyelid movements, and heart rate.

4. The vehicle system of claim 2, wherein the one or more controlled environment scenarios are provided by a vehicle simulation system configured to collect one or more second biosignals and vehicle telemetry information, and wherein one or more reference mental states are determined from the one or more second biosignals and driving performance is correlated based on the one or more reference mental states and the vehicle telemetry information.

5. The vehicle system of claim 1, wherein adjusting the one or more vehicle behaviors comprises one or more of adjusting one or more advanced driver-assistance system (ADAS) parameters and generating one or more notifications for presentation to the driver.

6. A computer-implemented method for predicting driving performance based on one or more mental states, the method comprising:
    collecting one or more first biosignals during a variable cognitive load vehicle environment scenario, wherein the one or more first biosignals are collected using a vehicle simulation system configured to provide a controlled environment;
    collecting vehicle telemetry information during the variable cognitive load vehicle environment scenario with the vehicle simulation system;
    determining one or more mental states based on the one or more first biosignals;

correlating the one or more mental states to the vehicle telemetry information to determine one or more driving performance metrics;
    building a driving performance evaluator based on the one or more driving performance metrics; and
    feeding one or more second biosignals acquired with a vehicle to the driving performance evaluator to predict driving performance, wherein the variable cognitive load vehicle environment scenario comprises a plurality of periods, including a calibration period, a rest period, and a driving period comprising city driving portions and highway driving portions.

7. The computer-implemented method of claim 6, wherein the one or more first biosignals are collected by one or more sensors, including one or more infrared (IR) sensors configured to track eye movements and eyelid movements.

8. The computer-implemented method of claim 6, wherein the one or more first biosignals comprise eye movements and eyelid movements.

9. The computer-implemented method of claim 6, wherein the vehicle telemetry information comprises vehicle speed, vehicle acceleration, position within lane, steering wheel position, and pedal position.

10. The computer-implemented method of claim 6, wherein the variable cognitive load vehicle environment scenario comprises a session wherein a user operates a vehicle simulation system to drive along a preprogrammed route while executing a variable cognitive load testing.

11. The computer-implemented method of claim 10, wherein the variable cognitive load testing comprises an NBACK test performed at various times while driving.

12. A method of a vehicle computing system of a vehicle, comprising:
    collecting one or more first biosignals of a driver of the vehicle with one or more first biosensors of the vehicle;
    determining one or more mental states of the driver based on the one or more first biosignals;
    feeding the one or more mental states into a driving performance evaluator, wherein the driving performance evaluator is a neural network trained on data obtained with a vehicle simulation system, and wherein the vehicle simulation system comprises second biosensors configured to acquire second biosignals of one or more users of the vehicle simulation system during variable cognitive load testing;
    generating a predicted driving performance with the driving performance evaluator based on the one or more mental states; and
    determining one or more vehicle interventions based on the predicted driving performance.

13. The method of claim 12, wherein the neural network of the driving performance evaluator is trained on one or more reference mental states and one or more driving performance metrics determined based on the second biosignals.

14. The method of claim 13, wherein the one or more second biosensors comprise one or more infrared (IR) eyetracking sensors.

15. The method of claim 13, wherein the one or more driving performance metrics and one or more reference mental states are generated by the vehicle simulation system, which is configured to provide a controlled environment for data collection.

16. The method of claim 15, wherein the vehicle simulation system is configured to establish various levels of cognitive load, wherein the one or more driving performance metrics are correlated to the various levels of cognitive load based on the one or more reference mental states and telemetry information of the vehicle simulation system.

17. The method of claim 12, wherein the one or more vehicle interventions comprise one or more of vehicle parameter adjustments and notifications presented to the driver via a vehicle infotainment unit.

18. The computer-implemented method of claim 6, wherein the driving performance evaluator is a neural network trained on the driving performance metrics, the one or more mental states, and/or one or more first biosignals, and wherein the computer-implemented method further comprises:

receiving driver input to one of confirm and correct predicted driving performance; and updating training of the neural network based on the driver input.

19. The method of claim 13, wherein the one or more driving performance metrics are determined by correlating the one or more reference mental states with vehicle telemetry information of the vehicle simulation system, and wherein correlating the one or more reference mental states with the vehicle telemetry information comprises correlating driving behaviors with various amounts of cognitive load to indicate how reaction time depends on mental load.

20. The method of claim 12, wherein the vehicle simulation system comprises a user input device configured to receive inputs from the one or more users of the vehicle simulation system during the variable cognitive load testing.

\* \* \* \* \*